United States Patent
Hartog et al.

(10) Patent No.: US 8,225,867 B2
(45) Date of Patent: *Jul. 24, 2012

(54) SYSTEMS AND METHODS FOR DISTRIBUTED INTERFEROMETRIC ACOUSTIC MONITORING

(75) Inventors: Arthur H Hartog, Winchester (GB); J Ernest Brown, Cambridge (GB); John Mervyn Cook, Cambridge (GB); Jonathan Elphick, Cambridge (GB); Paul S Hammond, Cambridge (GB); Ashley Bernard Johnson, Cambridge (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/085,921

(22) Filed: Apr. 13, 2011

(65) Prior Publication Data

US 2011/0188344 A1 Aug. 4, 2011

Related U.S. Application Data

(62) Division of application No. 11/934,551, filed on Nov. 2, 2007, now Pat. No. 7,946,341.

(51) Int. Cl.
*E21B 47/00* (2012.01)

(52) U.S. Cl. .... 166/250.01; 166/66; 385/13; 340/854.6; 250/269.1

(58) Field of Classification Search ............. 166/250.01, 166/250.11, 66; 367/25; 385/13; 340/854.6, 340/324, 374, 250
See application file for complete search history.

(56) References Cited

U.S. PATENT DOCUMENTS

| 5,194,847 | A | 3/1993 | Taylor et al. |
| 6,137,611 | A | 10/2000 | Boivin et al. |
| 6,412,353 | B1 | 7/2002 | Kleven et al. |
| 6,913,079 | B2 | 7/2005 | Tubel |
| 2001/0045129 | A1 | 11/2001 | Williams et al. |
| 2006/0165344 | A1* | 7/2006 | Mendez et al. ................ 385/13 |
| 2009/0114386 | A1 | 5/2009 | Hartog et al. |

FOREIGN PATENT DOCUMENTS

| GB | 2126820 A | 3/1984 |
| GB | 2222247 A | 2/1990 |
| GB | 2289331 A | 11/1995 |
| GB | 2402738 A | 12/2004 |
| GB | 2403292 A | 12/2004 |
| WO | 2006048647 A2 | 5/2006 |

(Continued)

OTHER PUBLICATIONS

Barnoski et al: "Fiber waveguides: a novel technique for investigating attenuation characteristics", Applied Optics, vol. 15, No. 9, 1976, pp. 2112-2115.

(Continued)

*Primary Examiner* — Kenneth L Thompson
*Assistant Examiner* — Yong-Suk Ro

(57) ABSTRACT

Acoustic monitoring is carried out using a fiber optic cable. Coherent Rayleigh noise generated by the transmission of a coherent beam of radiation through the fiber optic cable is detected, a phase of the coherent Rayleigh noise is measured and the measured phase is processed to identify an acoustic occurrence along the fiber optic cable. In certain aspects an optical fiber serves as a distributed interferometer that may be used to monitor a conduit, wellbore or reservoir. The distributed interferometric monitoring provides for accurate detection of acoustic occurrences along the fiber optic cable and these acoustic occurrences may include fluid flow in a pipeline or wellbore, processes taking place in a wellbore or pipeline, fracturing, gravel packing, or production logging.

14 Claims, 4 Drawing Sheets

FOREIGN PATENT DOCUMENTS

| | | |
|---|---|---|
| WO | 2006048647 A3 | 8/2006 |
| WO | 2008098380 A1 | 8/2008 |

OTHER PUBLICATIONS

Brinkmeyer: "Analysis of the backscattering method for single-mode optical fibers", Journal of the Optical Society of America, vol. 70, No. 8, 1980, pp. 1010-1012.

Cranch et al: "Large-scale remotely interrogated arrays of fiber-optic interferometric sensors for underwater acoustic applications", IEEE Sensors Journal, vol. 3, No. 1, 2003, pp. 19-30.

Hartog et al: "On the theory of backscattering in single-mode optical fibers", Journal of Lightwave Technology, vol LT-2, No. 2, 1984, pp. 76-82.

Horiguchi et al: "Tensile strain dependence of Brillouin frequency shift in silica optical fibers", IEEE Photonics Technology Letters, vol. 1, No. 5, 1989, pp. 107-108.

Juarez: "Distributed fiber-optic intrusion sensor system", Journal of Lightwave Technology, vol. 23, No. 6, 2005, pp. 2081-2087.

Juskaitis: "Distributed interferometric fiber sensor system", Optics Letters, vol. 17, No. 22, 1992, pp. 1623-1625.

Juskaitis et al: "Interferometry with Rayleigh backscattering in a single-mode optical fiber", Optics Letters, vol. 19, No. 3, 1994, pp. 225-227.

Lagakos et al: "Phase-modulated fiber optic acoustic sensors", ISA Transactions, vol. 28, No. 2, 1989, pp. 1-6.

Mermelstein et al: "Rayleigh scattering optical frequency correlation in a single-mode optical fiber", Optics Letters, vol. 26, No. 2, 2001, pp. 58-60.

Nash: "Review of interferometric optical fibre hydrophone technology", IEE Proceedings on Radar, Sonar and Navigation, vol. 143, No. 3, 1996, pp. 204-209.

Neumann: "Analysis of the backscattering method for testing optical fiber cables", Archiv für Electronik und Ürteibungstechnik, vol. 34, 1980, pp. 157-160.

Parker et al: "A fully distributed simultaneous strain and temperature sensor using spontaneous Brillouin backscatter", IEEE Photonics Technology Letters, vol. 9, No. 7, 1997, pp. 979-981.

Posey et al: "Strain sensing based on coherent Rayleigh scattering in an optical fibre", Electronics Letters, vol. 36, No. 20, 2000, pp. 1688-1689.

Shatalin et al: "Interferometric optical time-domain reflectometry for distributed optical-fiber sensing", Applied Optics, vol. 37, No. 24, 1998, pp. 5600-5604.

Wood et al: "Observation of coherent Rayleigh noise in single-source bidirectional optical fiber systems", Journal of Lightwave Technology, vol. 6, No. 2, 1988, pp. 346-352.

\* cited by examiner

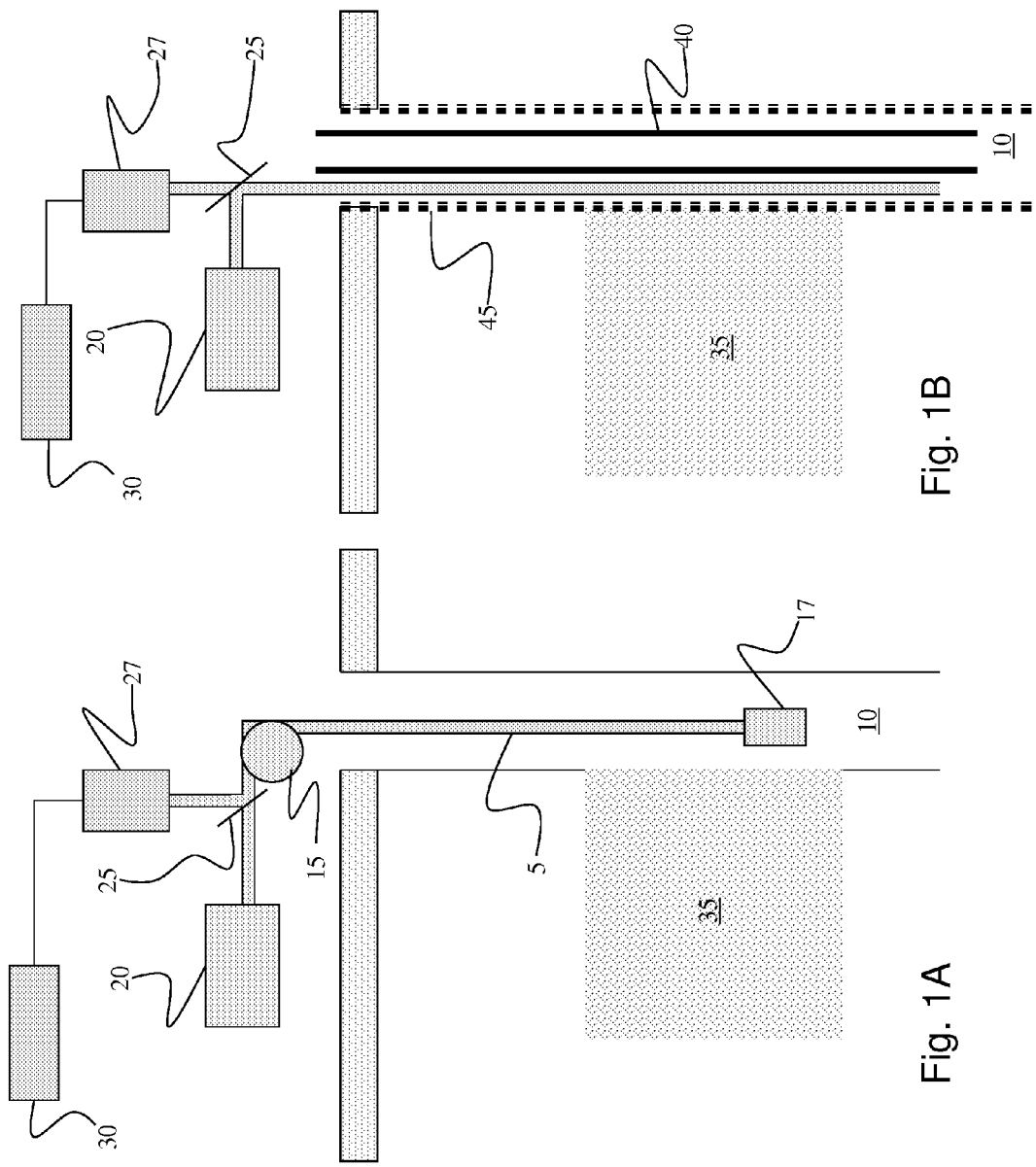

SYSTEMS AND METHODS FOR DISTRIBUTED INTERFEROMETRIC ACOUSTIC MONITORING

This patent application is a divisional from U.S. patent application Ser. No. 11/934,551 filed Nov. 2, 2007 which is incorporated by reference herein in its entirety.

BACKGROUND

This disclosure relates in general to a method and system for monitoring a conduit, a wellbore or a reservoir associated with hydrocarbon production or transportation and/or carbon dioxide sequestration. More specifically, but not by way of limitation, embodiments of the present invention provide for using an optical fiber as a distributed interferometer that may be used to monitor the conduit, wellbore or reservoir.

A wide variety of techniques have previously been used to monitor reservoirs, wellbores and/or pipes containing hydrocarbons, such as sub-sea pipelines, transportation pipelines and/or the like. Monitoring of wellbores may often occur during completion and/or production stages and monitoring may comprise monitoring reservoir conditions, estimating quantities of hydrocarbons (oil and gas), monitoring treatment of the wellbore—which may include monitoring treatment fluids applied to the wellbore, the effects of the treatment fluids and/or the like—monitoring operation of downhole devices in the wellbores, determining conditions in the wellbore, determining condition of the wellbore itself and/or downhole devices, monitoring hydrocarbon production, monitoring completion processes, monitoring stimulation processes, monitoring the formation surrounding the wellbore, monitoring flow of hydrocarbons through a conduit and/or the like.

Reservoir monitoring may involve determining downhole parameters at various locations in a producing wellbore over an extended period of time. To provide for this type of monitoring in a wellbore or the like, wireline tools may be deployed into the wellbore to obtain measurements. Such use of wireline tools is invasive, may affect other operations being performed in the wellbore and/or operations it that might be desirable to perform in the wellbore when the wireline tool is deployed.

In general, wireline monitoring involves transporting the wireline tools to the wellsite, conveying the tools into the wellbores, shutting down the production, making measurements over extended periods of time and processing the resultant data. Use of wireline tools may be expensive, cause production delay and because the wireline tools may, in certain circumstances, have to be removed from the wellbore for other wellbore procedures to occur, may not provide for detecting/analyzing continuous data from the wellbore. Similarly, with conduits containing hydrocarbons, periodic testing along/through the conduit as to the condition of the conduit, analysis of any material in and/or flowing in the conduit and/or analysis of the hydrocarbons in the conduit may also be invasive, expensive, cause production/transportation delay, only provide for sporadic monitoring, only provide for disjointed monitoring of specific locations along the conduit and/or the like.

With regard to the production stages of a well, a wide range of intervention production logging tools exist which may be lowered into a well and measure flow conditions at a known location. These tools may be moved through the well to provide multi-point measurements. These tools are not ideally suited to monitoring simultaneous events at multiple locations or for long period deployments. In addition, it may be difficult to log below wellbore architecture like valves, packers or pumps. Also the very fact of installing such a tool may change conditions such that the measured results are not representative of those when the tool is not present.

With regard to the wellbore, monitoring of sand in the wellbore may be of high important for certain types of wellbores, since the production of sand in the wellbore may have detrimental effects on production of hydrocarbons from the wellbore. Sand may be considered to be any type of particulate matter in the wellbore. Sand may cause such detrimental effects as clogging well lines, adversely affecting pump operation, causing corrosion and/or erosion to pipes and associated equipment and/or the like. As such, sand monitoring along the wellbore may be necessary so that steps may be taken to counter its possible adverse effects.

Additionally, with regard to wellbore processes, gravel packing may be a process that it is desirable to monitor and to manage. The gravel packing process involves pumping a gravel slurry along a length of the wellbore and then allowing the gravel to drop-out filling the wellbore around a sand screen disposed in the wellbore. Typically, the lower section of the wellbore may be filled from heel to toe (often referred to as the Alpha wave) then the upper section from toe to heel (often referred to as the Beta wave).

A full understanding of how and where gravel deposition is occurring in real-time may provide the knowledge required to optimize the gravel placement process. Downhole monitoring of the treatment may show when gravel deposition along the screen is not progressing as desired, with either areas of low gravel concentration (possibly leading to voids) or very high concentrations (possibly leading to premature bridging). When problems with the pack deposition are identified, treatment pumping parameters may be altered to help rectify the situation. Pump rate, fluid viscosity or gravel concentration may all be managed if real-time monitoring is occurring to improve the gravel deposition. Downhole hardware may also be customized to allow for altered flow paths based on information about the gravel bed development.

In addition to monitoring many other processes and procedures in a wellbore, such as gas lift monitoring, flow obstacles, device operation, stimulation processes etc., it may also be desirable to monitor transportation of hydrocarbons through pipelines for flow assurance purposes and/or the like. Further, with increased attention to and development of carbon dioxide sequestration in subsurface locations, a permanent or semi-permanent type sensor for monitoring the transportation and subsurface sequestration of carbon dioxide is also desirable.

SUMMARY

This disclosure relates in general to a method and system for monitoring a pipeline, a wellbore or a reservoir associated with hydrocarbon production or transportation and/or carbon dioxide sequestration. More specifically, but not by way of limitation, embodiments of the present invention provide for using an optical fiber as a distributed interferometer that may be used to monitor the conduit, wellbore or reservoir. In certain aspects of the present invention, the sensitivity of the distributed interferometer is configured to provide for acoustic monitoring of the reservoir, wellbore and/or pipeline.

Embodiments of the present invention provide for developing coherent Rayleigh noise ("CRN") in a fiber optic sensor and processing the developed CRN in the fiber optic sensor to provide for monitoring a wellbore, reservoir or conduit. CRN may be generated in the fiber optic sensor by injecting a coherent beam of electromagnetic radiation into the fiber optic sensor, wherein the coherent beam and the fiber optic sensor are configured to provide for interference effects of the backscatter in the fiber optic at a detection point. In embodiments of the present invention, the interference effects in the backscatter from the fiber optic sensor at a detection point may be provided by configuring the length of the fiber optic to be shorter than a coherence of the source producing the beam, by configuring the coherent beam as a pulse of the coherent electromagnetic radiation having a pulse duration equivalent to or shorter then a coherence length of the source producing the pulse of the coherent electromagnetic radiation and/or the like.

In certain aspects of the present invention, because the fiber optic sensor is configured to act as an interferometer, the fiber optic sensor is sensitive enough to detect mechanical waves originating from acoustic occurrences/events in the wellbore, reservoir and/or conduit. The acoustic events or occurrences may be changes in flow regimes, changes in flow constituents, interactions of solid materials in the wellbore or pipeline or a fluid in the wellbore or pipeline with the fiber optic sensor, the wellbore, a pipeline and/or the like. The mechanical waves may interact with the fiber optic sensor and may cause a change in the CRN (due to changes in relative positions of scattering sites in the fiber optic sensor due to the interaction between the mechanical wave and the fiber optic sensor) and, as a result, may be detected. In other aspects, temperature and pressure changes in the wellbore, reservoir and/or pipeline may change the CRN properties of the fiber optic and may be monitored and/or detected. The fiber optic sensor may be a bare or sheathed fiber coupled with the wellbore, a lining of the wellbore, a pipeline etc. or it may be a bare or sheathed fiber positioned appurtenant to the wellbore, a lining of the wellbore, a pipeline etc.

Some of the embodiments of the present invention provide for using the optical fiber to acoustically monitor the wellbore, conduit and/or reservoir. More specifically, but not by way of limitation, in one embodiment of the present invention, one or more optical fibers may be disposed along the wellbore or the conduit to act as a distributed acoustic sensor. In some embodiments, one or more acoustic transducers may be coupled along the fiber optic to increase the acoustic sensitivity of the fiber optic.

In an embodiment of the present invention, analysis of the detected/monitored CRN may provide an understanding of conditions in or around the wellbore and/or the conduit—including but not limited to formation conditions, presence of sand in the wellbore or conduit, gravel packing processes associated with the wellbore, fracturing, treatments occurring in the wellbore or conduit, wellbore integrity, production data, conduit integrity, flow assurance, storage properties of carbon dioxide sequestered in a subterranean formation and/or the like—and/or conditions of materials contained in the wellbore and/or the conduit, such as multiphase analysis, blockages, hydrocarbon flow, hydrocarbon composition and/or the like. Analysis of the CRN may be performed by theoretical analysis, modeling, experimentation, comparison with results from previous operation of the acoustic monitoring system, results from operation of the acoustic monitoring system under known conditions and/or the like.

In one aspect of the present invention, time of flight measurements of a light pulse along the one or more fiber optic sensors may be used in conjunction with the monitored CRN in the one or more fiber optics to determine a location in the wellbore or conduit of an acoustic occurrence.

BRIEF DESCRIPTION OF THE DRAWINGS

In the figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

The invention will be better understood in the light of the following description of non-limiting and illustrative embodiments, given with reference to the accompanying drawings, in which:

FIG. 1A is a schematic-type illustration of an intervention tool for monitoring a wellbore or reservoir, in accordance with an embodiment of the present invention;

FIG. 1B is a schematic-type illustration of a permanent or semi-permanent system for monitoring a wellbore or reservoir, in accordance with an embodiment of the present invention;

DETAILED DESCRIPTION

Figure 1C:
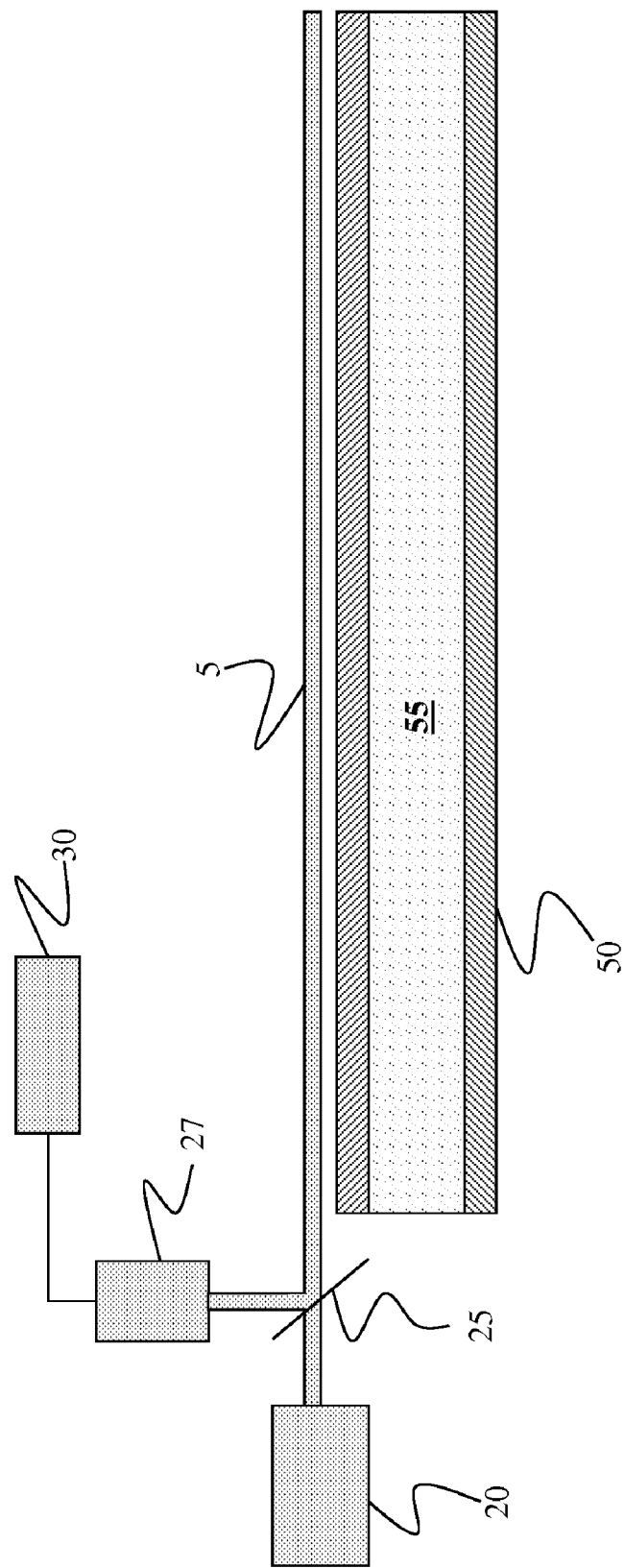
FIG. 1C is a schematic-type illustration of a system for monitoring a pipeline, in accordance with an embodiment of the present invention.

The ensuing description provides exemplary embodiments only, and is not intended to limit the scope, applicability or configuration of the disclosure. Rather, the ensuing description of the exemplary embodiments will provide those skilled in the art with an enabling description for implementing one or more exemplary embodiments. It being understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, systems, structures, and other components may be shown as components in block diagram form in order not to obscure the embodiments in unnecessary detail. In other instances, well-known processes, techniques, and other methods may be shown without unnecessary detail in order to avoid obscuring the embodiments.

Also, it is noted that individual embodiments may be described as a process which is depicted as a flowchart, a flow diagram, a structure diagram, or a block diagram. Although a flowchart may describe the operations as a sequential process, many of the operations can be performed in parallel or concurrently. In addition, the order of the operations may be re-arranged. Furthermore, any one or more operations may not occur in some embodiments. A process is terminated when its operations are completed, but could have additional steps not included in a figure. A process may correspond to a method, a procedure, etc.

Embodiments of the present invention provide systems and methods for monitoring a reservoir, wellbore or a conduit containing and/or transporting one or more hydrocarbons or carbon dioxide. More specifically, but not by way of limitation, embodiments of the present invention provide systems and methods in which one or more fiber optics may be used as a distributed sensor to simultaneously monitor an entire section of the reservoir, wellbore and/or pipeline throughout. The one or more fiber optics may be coupled with the wellbore, a pipe in the wellbore, the pipeline and/or the like to provide for the distributed monitoring or the one or more fiber optics may be disposed appurtenant to the wellbore, the pipe in the wellbore, the pipeline and/or the like to provide for the distributed monitoring. In an embodiment of the present invention, CRN is generated and monitored in the fiber optic to provide that the fiber optic acts as an interferometer that may acoustically monitor the reservoir, wellbore and/or pipeline.

When electromagnetic radiation is transmitted through a fiber optic, a portion of the electromagnetic radiation will be backscattered in the fiber optic by impurities in the fiber, areas of different refractive index in the fiber that may be generated in the process of fabricating the fiber, interactions with the surfaces of the fiber optic and/or connections between the fiber and other fibers or components and/or the like (collectively referred to herein as scattering sites, scattering locations, scattering points, scatterers or the like). This backscattered electromagnetic radiation in the fiber optic is commonly treated as unwanted noise and steps may be taken to reduce such backscattering. However, the backscatter may be used in a technique that is commonly known as Optical Time Domain Reflectometry ("OTDR").

In OTDR, a fiber optic may be coupled with a narrow-band electromagnetic source, such as a narrow-band laser or the like. The laser may be used to produce a short pulse of light that is launched into the fiber optic and a fraction of the scattered light that falls within the angular acceptance cone of the fiber in the return direction, i.e., towards the laser source, may be guided back to the launching end of the fiber as a backscattered signal. The backscattered signal may be used in OTDR to provide information regarding the integrity/condition of the fiber optic.

As such, a detector, that may provide for converting electromagnetic signals, such as optical signals, to electrical signals, may be coupled with the fiber at a location upstream of a portion of the optical fiber being used to transmit the electromagnetic radiation. A signal processor may be coupled with the detector and may process the back scatter in the optical fiber so that the backscatter may be processed to determine the integrity of the fiber optic downstream of the detector and the condition of the downstream fiber optic. In this way, OTDR may provide for monitoring the integrity of fiber optics used to transmit data, to determine operating characteristics of a fiber optic used to transmit data, to determine locations where a fiber optic has been broken or is not functioning properly—i.e. for security monitoring or data transmission assurance, to remotely detect faults in optical transmission systems—or to analyze operating characteristics of devices, such as amplifiers etc., associated with the fiber optic.

The fundamentals of OTDR in multimode or single-mode fibers is based on incoherence, i.e., an assumption that, owing to the spectral width of the source, the backscatter in the fiber within a spatial resolution cell will add as intensity. As such, a backscatter waveform generated by the signal processor in OTDR generally takes the form of a decaying exponential, the slope of which is determined by the attenuation of the fiber.

While OTDR is one type of "noise" in the fiber optic, there is also another type of noise that is commonly referred to as Coherent Rayleigh Noise ("CRN"). CRN arises when the different electromagnetic radiation signals traveling in the fiber optic interfere with one another. As such, in CRN, the electric field vectors from each of the scattering points in the fiber optic within a spatial resolution region of the fiber optic may add as electric field prior to the square-law detection that may occur at a detector. In the electric field vector summation, the phase of the individual electromagnetic signals backscattered by different scattering sites may provide for interference effects that may create an interference pattern that may be detected by the detector.

Scattering occurs in optical fibers, as noted above, due to the microscopic fluctuations in the refractive index of the glass of the fiber. When the coherence length of a source injecting pulses of coherent electromagnetic radiation into the fiber approaches the pulse length, interference effects will occur in the backscatter signal. For a pulse from a perfectly coherent source, the electric field of a pulse of temporal width t may be described as a function of distance along the fiber optic. Considering two scattering sites, the intensity of the backscatter may be determined by the optical phase-separation of the two sites.

As such, correlation of successive backscatter traces from successive pulses provides for identifying changes in the relative location of scattering sites in the fiber optic. For small changes in the relative location of the scattering sites, the overall pattern of the trace of the backscatter will remain the same but there will be changes in the intensity of the peaks in the traces. For larger changes in the relative locations of the scattering locations, the actual pattern of the successive traces will change.

In embodiments of the present invention, CRN may be the dominant noise in the fiber optic. In general, previously, CRN has been treated as a nuisance and various methods developed to remove or alleviate the CRN generated in a fiber optic cable transmitting coherent electromagnetic radiation. (See, e.g., U.S. Pat. No. 6,137,611, "Suppression of Coherent Rayleigh Noise in Bidirectional Communication Systems," to Boivin et al.). However, while CRN may produce noise issues in transmission systems, a coherent OTDR is, in effect, a distributed interferometer that may be sensitive to small changes in scatterer site locations in the fiber such as may be produced by interactions of acoustic waves with the fiber optic. Therefore, in an embodiment of the present invention, CRN may be generated and monitored in an optic fiber to provide that the optical fiber may act as a distributed-acoustic-sensor to monitor a reservoir, a wellbores and/or a pipeline.

FIGS. 1A-C are schematic-type illustrations of fiber optic monitors configured for using CRN to monitor a reservoir, wellbore and/or a pipeline, in accordance with an embodiment of the present invention.

FIG. 1A illustrates a fiber-optic-distributed-interferometeric tool for monitoring a wellbore or reservoir, in accordance with an embodiment of the present invention. In FIG. 1A, the fiber-optic-distributed-interferometeric tool may comprise a fiber optic 5 that may be deployed in a wellbore 10. The fiber optic 5 may be deployed in the wellbore 10 from a spooling device 15 or the like to provide a tool that may be installed in the wellbore 10 to make measurements when and as required. The fiber optic 5 may comprise a part of another wellbore tool and may be coupled with such a tool, may be coupled with a wellbore cable, a slickline, an I-Coil, coiled tubing and/or the like. The I-Coil may comprise a fiber bundle that may welded and hermetically sealed into a small outer-diameter stainless steel tube, where the outer-diameter maybe of the order of millimeters or tenths of millimeters.

In an embodiment of the present invention, the fiber optic 5 may be coupled with a coherent electromagnetic source 20. The coherent electromagnetic source 20 may comprise a laser or the like. The coherent electromagnetic source 20 may be configured to provide that the coherence length of the coherent electromagnetic source 20 approaches the spatial resolution of the fiber-optic-distributed-interferometeric tool and/or the coherent electromagnetic source 20 may be configured to inject a pulse of coherent electromagnetic radiation into the fiber optic 5 where the coherence time of the coherent electromagnetic source 20 is similar to or longer than the duration of the injected pulse. In such configurations, the backscatter generated in the fiber optic 5 within a spatial resolution cell will add coherently, wherein the spatial resolution cell comprises a length of the fiber optic 5 for which spatial resolution exists. The spatial resolution cell for the fiber-optic-distributed-interferometeric tool may comprise the entire length of the fiber optic 5 or a portion of the fiber optic 5 depending upon the coherence length of the coherent electromagnetic source 20 and/or the length of a pulse of electromagnetic radiation generated by the coherent electromagnetic source 20 and injected into the fiber optic 5. Within the spatial resolution cell, the fiber optic 5 acts as a distributed interferometer where the backscatter generated from different scattering locations in the fiber optic 5 may interfere according to the phase of the backscatter.

A beam splitter 25 or the like may provide for directing the backscatter generated in the fiber optic 5 onto a detector 27. The detector 27 may comprise a photo-detector or the like. The beam splitter 25 may comprise a circulator that may direct radiation from the coherent electromagnetic source 20 into the fiber optic 5 and may receive radiation returned from the fiber optic 5 and direct the received radiation into the detector 27. The detector 27 may be coupled with a processor 30 that may process an output signal from the detector 27. The detector 27 may detect the intensity of the backscattered radiation input from the beam splitter 25 as a function of time and the processor 30 may process this output into a digital form, a trace and/or the like. The processed output may be communicated to other systems and/or processors or processing software, stored and/or displayed. The processor 30 may comprise a signal processor or the like.

In incoherent OTDR, the backscatter waveform generally takes the form of a decaying exponential, the slope of which is determined by the attenuation of the fiber. In CRN, as generated within the spatial resolution cell of the fiber-optic-distributed-interferometeric tool of FIG. 1A, the exponential decay of the backscatter waveform is modulated by interference effects. The resulting waveform may have a spiky, jagged, appearance where the spikes in the waveform correspond to positions along the fiber where the backscattered signals originating from individual scattering centers are largely in phase and as a result add with one another to produce an enhanced output at the detector 27.

If the fiber optic 5 and the source frequency from the coherent electromagnetic source 20 are stable then the output of the detector 27 processed by the processor 30 is static, although random. However, small local perturbations of the fiber optic 5 may alter the relative phasing of the scatterers and, thus change the appearance of the CRN waveform. As such, the fiber-optic-distributed-interferometeric tool of embodiments of the present invention may be highly sensitive, since the spacing between scatterers needs to be changed by only a fraction of an optical wavelength in order to radically affect the local interference at the detector; hence embodiments of the present invention may provide for acoustic monitoring of a wellbore, a pipeline and/or areas around the wellbore and/or the pipeline including reservoirs that may contain hydrocarbons or sequestered carbon dioxide.

In an embodiment of the present invention, a pulse of coherent radiation may be generated by the coherent electromagnetic source 20 and injected into the fiber optic 5 and a first output from the detector 27 may be processed by the processor 30. Subsequently, a second pulse of coherent radiation may be generated by the coherent electromagnetic source 20 and injected into the fiber optic 5 and a second output from the detector 27 may be processed by the processor 30. If the fiber optic 5 is stable the first and the second output will correspond. However, if the coherent Rayleigh backscatter signal processed by the processor 30 changes, this may indicate that the fiber optic 5 is not stable, i.e. that its temperature has changed and/or the cable has been elongated or compressed or the fiber optic 5 has interacted with an acoustic wave.

In one embodiment of the present invention, the light launched into the fiber may take the form of a waveform that may be more complex than a simple pulse. In such embodiments, the more complex waveform may generate an interference pattern or the like that may be more interpretable, contain more information and/or the like then a system in which a simple single pulse is injected into the fiber optic. Merely by way of example, in certain aspects of the present invention, a pair of mutually coherent pulses each having a slightly different optical frequency may be launched into the fiber optic. In such aspects, the use of the pair of mutually coherent pulses may allow the backscatter from a region separated by the two pulses to interfere, so that a measurement of the optical phase difference accumulated over the region separated by the two pulses, which may be more easily interpreted than the previously described single-pulse approach. Equivalently, a compensating interferometer, such as a Mach-Zehnder interferometer, placed before the optical detector may provide a measure of the phase changes in the region defined by the path-length imbalance of the compensating interferometer.

Because of the sensitivity of the CRN signal to the smallest changes relative locations of scatterers in the fiber optic 5, since the spacing between scatterers needs to be changed by only a fraction of an optical wavelength in order to radically affect the local interference, the fiber-optic-distributed-interferometeric tool of the present invention may be used to acoustically monitor the wellbore 10. As such, the fiber-optic-distributed-interferometeric tool of the present invention may be used to detect and monitor vibrations/mechanical waves in the wellbore that may be produced by occurrences in a reservoir 35 adjacent to the wellbore 10, by processes occurring in or around the wellbore 10, by changes in fluids flowing in or around the wellbore 10 and/or the like.

By deploying the fiber-optic-distributed-interferometeric tool of the of the present invention listening in a wellbore and looking at the evolution of the noise signatures it may be possible monitor the production characteristics of the well as well as the health of many of the mechanical tools associated with the well. Additionally, the fiber-optic-distributed-interferometeric tool of the present invention may be used as a distributed acoustic sensor that may be deployed in a well as a monitoring system. With regard to production logging, the fiber-optic-distributed-interferometeric tool according to an embodiment of the present invention may provide significant benefits by providing for tracking events and making measurements along the entire wellbore simultaneously. This may be especially useful for long period deployments of the fiber-optic-distributed-interferometeric tool. It may also bring benefits in deployment in terms of low cost monitoring in wells where a conventional PL string cannot be deployed (for example below a pump) or would be too expensive.

With regard to acoustic occurrences in a wellbore, there may be a considerable range of events which occur in a well that produce acoustic perturbations. Multiple fluids and phases (gas bubbles, solids, and some liquid mixtures) may produce recognizable acoustic signatures. This can include sound attenuation from foam type mixtures. Further, mechanical events can produce sound and vibration. Cavitation also produces sound. Merely by way of example, an embodiment of the fiber-optic-distributed-interferometeric tool of the present invention may be used as an acoustic sensor for sand detection purposes in surface and down-hole environments. The impact of individual sand grains on such an acoustic sensor may be distinct and detectable. Thus, acoustic systems in accordance with embodiments of the present invention may be used to qualitatively detect presence of sand in a wellbore. Typically sand hitting a pipe wall may produce broadband noise in and around a 2 to 5 kHz region, which may be distinct from flow noise that may generate associated noise at a frequency below 100 Hz.

Similarly, acoustic systems in accordance with embodiments of the present invention may be coupled with a gravel pack assembly and may be used to detect the sand settling around a screen. In such embodiments, the acoustic signature generated by the CRN may change significantly during different parts of the gravel packing processes providing that the process may be acoustically monitored.

In some embodiments of the present invention, the processed output from the processor 30 may be compared with a reference record. In such embodiments, new peaks and other changes in the CRN signal level may be indicative of changes in the fiber optic 5. The reference record may be a record of CRN for the fiber-optic-distributed-interferometeric tool when the tool is first deployed in the wellbore 10, may be a record of the CRN for the fiber-optic-distributed-interferometeric tool when the tool is deployed in the wellbore 10 under known conditions, may be a record of the CRN for the fiber-optic-distributed-interferometeric tool when a process to be monitored has commenced, is at a known process point and/or the like, may be a record of the CRN for the fiber-optic-distributed-interferometeric tool in another wellbore under reference conditions, may be a previous record of the CRN for the fiber-optic-distributed-interferometeric tool and/or the like.

In some embodiments of the present invention, theoretical analysis, modeling, experimental analysis or data from previous use of the fiber-optic-distributed-interferometeric tool may be used by the processor 30 and/or a secondary processor to analyze CRN signals in the fiber optic 5. In such embodiments, the wellbore 10 may be monitored and CRN signals may be analyzed to determine what events are giving rise to detected CRN signals. In conditions in the wellbore 10 where temperatures are not fluctuating and the strain on the fiber optic 5 is consistent changes in the CRN signal may be analyzed as being due to acoustic interactions with the fiber optic 5. Moreover, in certain aspects, signal processing may provide for removing temperature and/or strain effects from the CRN output of the fiber optic 5. In some embodiments of the present invention, the fiber-optic-distributed-interferometeric tool may be used in conjunction with a distributed temperature sensor ("DTS").

The time between pulse launch from the coherent electromagnetic source 20 into the fiber optic 5 and receipt of a backscattered signal is proportional to the distance along the fiber optic 5 to the source of the backscattering. As such, in an embodiment of the present invention, the processor 30 may process the time of flight associated with a change in the CRN signal to determine where along the fiber optic 5 an acoustic event is occurring. Accordingly, in some embodiments of the present invention, the duty cycle of the pulses generated by the coherent electromagnetic source 20 may be greater than their individual round trip transit times in the fiber optic 5 so as to obtain an unambiguous return signal. Merely by way of example, in certain aspects of the present invention, to obtain high spatial resolution, the pulses injected in the fiber optic 5 from the coherent electromagnetic source 20 may be short in duration (e.g., between a few and tens of microseconds) and high in intensity (e.g., tens of mile-watts peak power) to provide a good signal to noise ratio.

In some aspects of the present invention, the fiber optic 5 may have a non-reflective end 17 to remove/reduce interference effects of reflected signals with the CRN signal. In other aspects of the present invention, one or more transducers, not shown, such as microphones or the like, may be coupled along the fiber optic 5 to provide for increasing the acoustic sensitivity of the fiber-optic-distributed-interferometeric tool.

In yet other aspects of the invention, the distributed nature of the backscatter may be enhanced by inclusion of weak reflectors within the fibre, such as fibre Bragg gratings, mechanical splices or small bubbles deliberately introduced in fusion splices. Such a structure may be used to form an interferometric sensor array. From knowledge of the characteristics of such a sensor array or the like, in an embodiment of the present invention, changes in coherent Rayleigh noise generated by the interferometric array may be processed to identify and/or determine a location of acoustic occurrences in a pipeline, reservoir and/or wellbore.

FIG. 1B illustrates a fiber-optic-distributed-interferometer for wellbore or reservoir monitoring, in accordance with an embodiment of the present invention. The fiber-optic-distributed-interferometer comprises the fiber optic 5 which may be deployed permanently or semi-permanently in the wellbore 10. The fiber optic 5 may be coupled with a cable disposed in the wellbore 10, coupled with a casing 40, coupled with a coiled tubing (not shown), disposed between the casing 40 and a face 45 of the earth formation surrounding the wellbore 10, coupled with and/or around equipment disposed in the wellbore 10, disposed in an earth formation and positioned appurtenant to the wellbore 10 and/or the like.

The fiber-optic-distributed-interferometer may be coupled with the coherent electromagnetic source 20, the detector 27 and the processor 30 to provide for monitoring of the wellbore 10 and/or the reservoir 35. In carbon dioxide sequestration applications, the carbon dioxide may be pumped down the wellbore 10 into the surrounding earth formation and/or the reservoir 35. In some embodiments of the present invention, the fiber-optic-distributed-interferometer may be used to monitor the storage of the carbon dioxide in the earth formation and/or the transportation/transfer of the carbon dioxide through the well to the earth formation.

By permanently deploying the fiber-optic-distributed-interferometeric fiber of the present invention in a wellbore and listening to the wellbore and looking at the evolution of the noise signatures, it may be possible to monitor the production characteristics of the well as well as the health of many of the mechanical tools associated with the well. Additionally, the fiber-optic-distributed-interferometer of the present invention may be used as a permanent or semi-permanent distributed acoustic sensor that may be deployed in a well as a monitoring system. With regard to production logging, the fiber-optic-distributed-interferometeric tool according to an embodiment of the present invention may provide significant benefits by providing for tracking events and making measurements along the entire wellbore simultaneously. This may be especially useful for long period deployments of the fiber-optic-distributed-interferometeric tool. It may also bring benefits in deployment in terms of low cost monitoring in wells where a conventional production logging string cannot be deployed (for example below a pump) or would be too expensive.

In one embodiment of the present invention, the fiber optic sensors may be permanently installed in wellbores at selected locations. In a producing wellbore, the sensors may continuously or periodically (as programmed) provide pressure and/or temperature measurements and/or acoustic detection of flow properties of fluids, such as production fluids, flowing in the wellbore. Such measurements may be preferably made for each producing zone in each of the wellbores. To perform certain types of reservoir analyses, it is required to know the temperature and pressure build rates in the wellbores. This requires measuring temperature and pressure at selected locations downhole over extended time periods after shutting down the well at the surface. In prior art methods, the well is shut down, a wireline tool is conveyed into the wellbore and positioned at one location in the wellbore. The tool continuously measures temperature and pressure and may provide other measurements, such as flow rates. These measurements are then utilized to perform reservoir analysis, which may include determining the extent of the hydrocarbon reserves remaining in a field, flow characteristics of the fluid from the producing formation, water content, etc. The above described prior art methods do not provide continuous measurements while the well is producing and require special wireline tools to be conveyed into the borehole. The present invention, on the other hand, provides in-situ measurements while the well is producing.

The fluid flow information from each zone may be used to determine the effectiveness of each producing zone. Decreasing flow rates over time may indicate problems with the flow control devices, such as screens and sliding sleeves, or clogging of the perforations and rock matrix near the wellbore. This information may be used to determine the course of action, which may include further opening or closing sliding sleeves to increase or decrease production rates, remedial work, such as cleaning or reaming operations, shutting down a particular zone, etc. The temperature and pressure measurements may be used to continually monitor each production zone and to update reservoir models. Embodiments of the present invention do not require transporting wireline tools to the location, something that can be very expensive at offshore locations and wellbores drilled in remote locations. Furthermore, in-situ measurements in accordance with embodiments of the present invention, and computed data may be communicated to a central office or the offices of the logging and reservoir engineers via satellite. This continuous monitoring of wellbores allows taking relatively quick action, which can significantly improve the hydrocarbon production and the life of the wellbore. The above described methods may also be taken for non-producing zones, to determine the effect of production from various wellbores on the field in which the wellbores are being drilled.

Regarding the use of the invention in connection with screens and flow control devices, whether in injector or producer wells, these devices may frequently contain regions within their mechanical structure where the flow is concentrated and deliberately restricted and/or not within the main wellbore. In these cases, the profile of the choking point may be designed, in accordance with an embodiment of the present invention, optionally to include vortex-shedding devices, such as a bluff body in the flow path or corrugation (or other structure) of the wall of the flow channels within the screen or flow control device. These structures, combined with the distributed (or array) interferometric sensor may provide for generation of a characteristic frequency that may be directly related to the flow velocity, the geometry of the flow channel and/or a Strouhal number characteristic of the body. In such embodiments, this may provide that a measure of the flow in each of the channels that has been so instrumented may be identifiable from the flow velocity and/or the time-of-flight to the channel of interest.

Changes in the characteristics of vibration and noise with position in the well may be correlated qualitatively with changing flow rates and flowing mixture compositions versus position; this is the "permanent production logging" concept. Changes in the character of noise and vibration over time may be indicative of changing flow conditions, for example, gas breakthrough into the well may be signaled by an increase in noise/vibration level at and above the location of the gas entry (with perhaps the resonant features characteristic of bubbles). Further, multiphase flows may produce more noise and vibration than single phase flows and fast flows may produce more noise/vibration than slower flows, thus they may be acoustically detected in embodiments of the present invention.

In a complex multilateral well, the flow noise or vibration measured in the mother wellbore at the point of entry of each lateral may be indicative of flow from that lateral.

In some embodiments of the present invention, crossing the bubble point pressure (or dew point pressure for a condensate) may be determinable by the deployed fiber-optic-distributed-interferometer from the increased levels of noise on the two-phase side compared to the single phase. This requires simultaneous measurement of pressure and temperature at the point of measurement and a time varying wellbore pressure such as will occur during well start-up or shut-in. Noise mapping up the production tubing may allow the point of gas/liquid break-out to be detected, and changes in this position will be indicative of changing pressure or temperature, or changing fluid composition.

In gas condensate wells there may be a change in the characteristics of flow noise generated within the formation when liquid condensate is being deposited as a trapped bank within the formation. Knowledge of condensate bank formation is important to management of the production from the well.

The opportunity of collecting a distributed acoustic log along the entire well may be of high value in the hydrocarbon industry. By combining acoustic monitoring results from embodiments of the present invention with DTS and/or distributed pressure sensing ("DPS"), uncertainty regarding interpretation of DTS and/or DPS measurements may be alleviated.

In certain aspects of the present invention, detection of liquid build-up in gas wells may be detected. In such gas wells, flow noise may be different for gas bubbling up through water than for single phase gas flow up the production interval and thus may be acoustically monitored/detected. Also, the vibration characteristics of a free cable (e.g. a fiber optic slick line) will be different when surrounded by water than by gas, and thus the presence of the liquid or gas may be detected. In an embodiment of the present invention, the fibers for DTS and/or DPS and the fiber-optic-distributed-interferometer can be readily deployed together.

In certain aspects of the present invention, a slickline may be used to contain the fiber optic and may be used with vortex shedders. The vortex shedders could be discs or spheres with diameters of a few centimeters and may be mounted periodically on the slickline. In such aspects, fluid flows past the vortex shedders, the vortex shedders may cause vortex formation and shedding with consequent generation of flow noise. The frequency of vortex shedding is (in single phase flow at least) a function of the flow rate. As such, an array of vortex shedders used in conjunction with the fiber-optic-distributed-interferometer of the present invention may be used as a distributed flow meter.

In some embodiments, the fiber-optic-distributed-interferometer may be disposed below a pump in the wellbore. In such embodiments, fluid entries may be located and the incoming fluids may be analyzed from the spatial and spectral characteristics of the flow noise/vibration detected by the fiber-optic-distributed-interferometer. Because rod-pumped well flow is intrinsically unsteady, in certain aspects, the noise/vibration changes due to the changing flow over the pumping cycle may be diagnosed to determine entries and/or inflow type.

In some embodiments of the present invention, the optical fiber may be deployed in a slick line or slick tube geometry used to monitor and tune gas lift valve systems. In other embodiments, downhole monitoring of noise and vibration created by a pump in the wellbore may be indicative of valve wear or other malfunctions.

FIG. 1C illustrates a fiber-optic-distributed-interferometer for pipeline monitoring, in accordance with an embodiment of the present invention. The fiber-optic-distributed-interferometer comprises the fiber optic 5 which may be coupled permanently or semi-permanently with a pipeline 50. The pipeline 50 may comprise a conduit or the like for transporting/containing hydrocarbons and/or carbon dioxide. The fiber optic 5 may be coupled with the pipeline 50, disposed within the pipeline 50, positioned in an earth formation appurtenant to the pipeline 50, positioned in a material coupled with the pipeline 50 and/or the like.

The fiber-optic-distributed-interferometer may be coupled with the coherent electromagnetic source 20, the detector 27 and the processor 30 to provide for monitoring of the pipeline 10 and/or a mixture 55 flowing in the pipeline 50. In certain aspects, the mixture 55 may comprise a hydrocarbon and/or carbon dioxide.

In some embodiments of the present invention, acoustic monitoring may provide for detection of growth or formation of a blockage (e.g. wax or hydrate) in a pipe as this may be may be indicated acoustically by an increase in flow noise/vibration at the location of the blockage.

In some embodiments of the present invention, acoustic monitoring may provide for detection of slugs or slug-type flow in a pipeline and/or a horizontal well. Distributed noise/vibration measurements from the fiber-optic-distributed-interferometer made upstream of a point of application of a control stimulus may be to detect and track the motion of fluid slugs along the well/pipeline so as to get early warning of the impending arrival of a problem, or a forward indicator that can be used to drive a slug control system.

Figure 2:
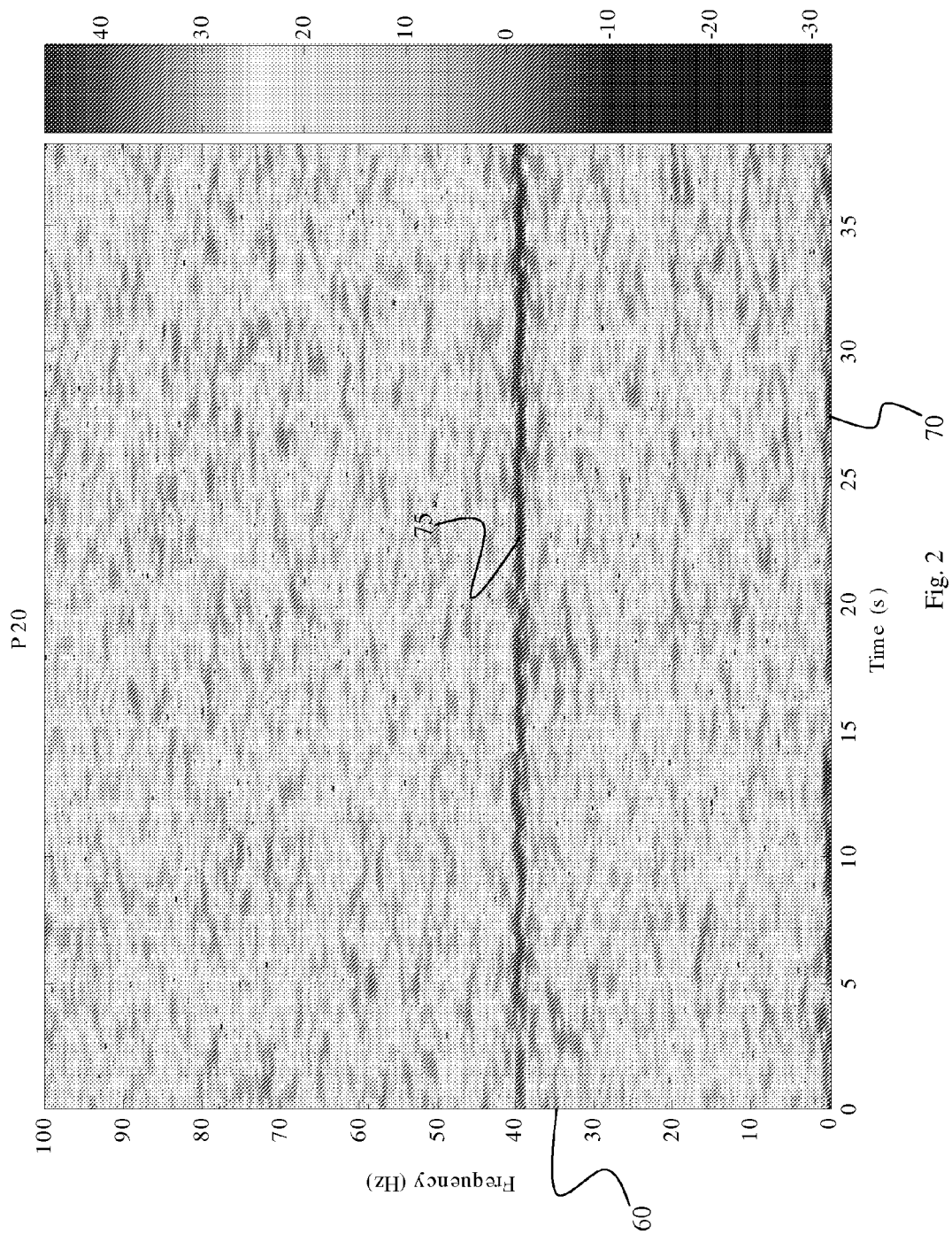
FIG. 2 illustrates an output signal from a system for monitoring a reservoir, wellbore or pipeline, in accordance with an embodiment of the present invention.

FIG. 2 illustrates an output signal from a system for monitoring a reservoir, wellbore or pipeline, in accordance with an embodiment of the present invention. The output signal shows frequency 60 versus time 70 for a CRN measurement obtained from a detector that was attached to a fiber optic buried in the ground 1 meter below the surface with a two stroke engine running at 40 Hz at ground level above the fiber. As can be seen in FIG. 2, a strong signal 75 was produced by the CRN system in accordance with an embodiment of the present invention illustrating the ability of such an embodiment to provide for acoustic monitoring.

Figure 3:
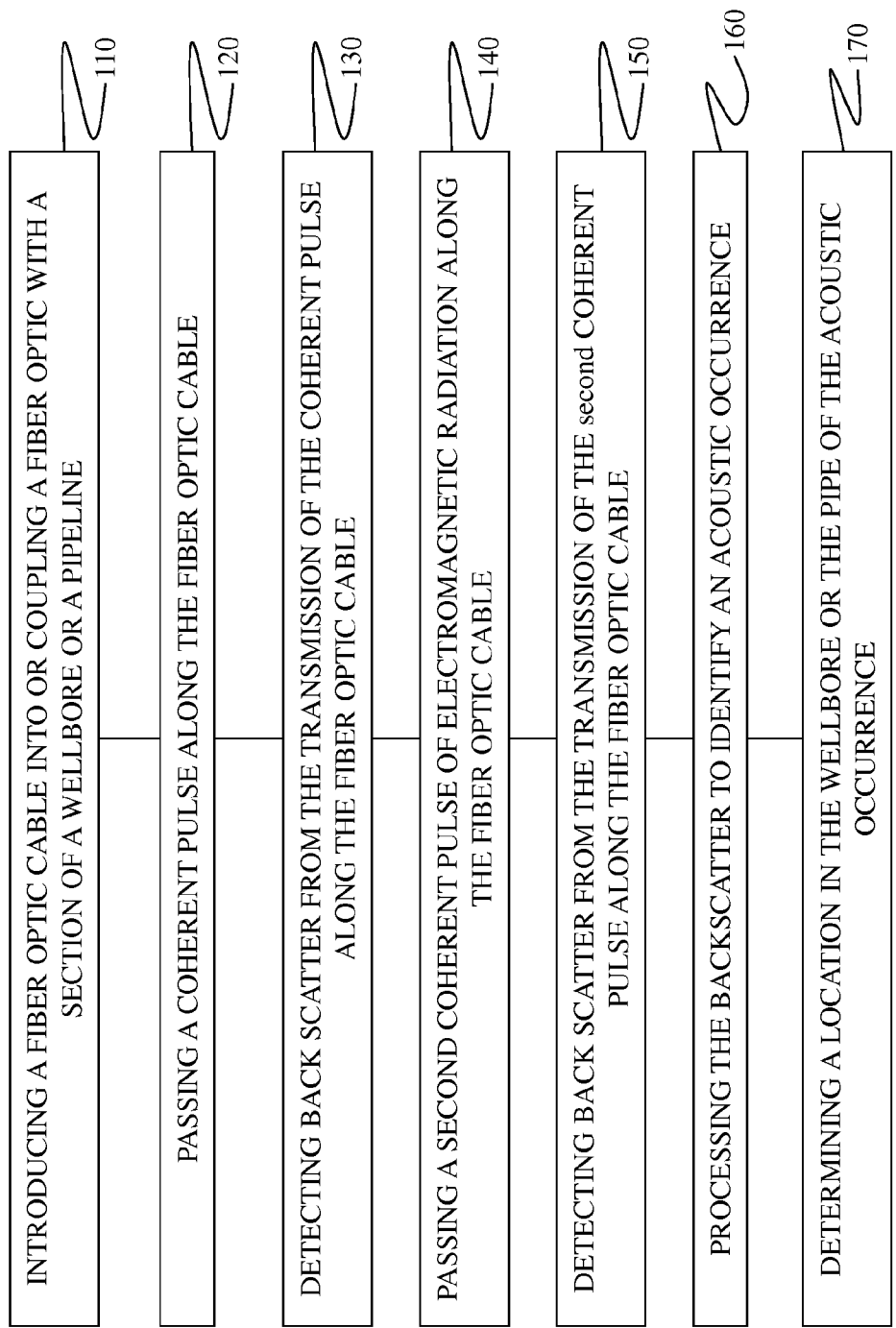
FIG. 3 is a flow-type illustration of a method of monitoring a reservoir, wellbore or pipeline, in accordance with an embodiment of the present invention.

FIG. 3 is a flow-type illustration of a method of monitoring a reservoir, wellbore or pipeline, in accordance with an embodiment of the present invention. In step 110, a fiber optic cable may be introduced into and/or coupled with a section of a wellbore or a pipeline. The fiber optic may be introduced into the wellbore or the pipeline as part of a measurement tool, i.e., coupled with a cable, coupled with a pipe and or the like, or it may be coupled directly with the pipeline, a casing of the wellbore, drillpipe, coiled tube and/or the like or it may be disposed in an earth formation appurtenant to the wellbore or pipeline.

In step 120, a coherent pulse of electromagnetic radiation from an electromagnetic radiation source is passed along the fiber optic cable. The electromagnetic radiation source may be a laser or the like and the pulse may be generated by gating the output of the electromagnetic radiation source. In an embodiment of the present invention, the coherence length of the electromagnetic radiation source approaches the pulse length and/or the spatial resolution of the fiber optic system to provide that CRN is developed in a spatial resolution cell of the fiber optic. By selecting a suitable pulse length and/or source coherence the spatial resolution cell may comprise the entire length of the fiber optic.

In step 130, backscatter from the transmission of the coherent pulse along the fiber optic cable may be detected. The backscatter may be detected from measurements from a detector or the like responsive to the electromagnetic radiation generated by the electromagnetic radiation source. The backscatter may be processed into trace, which may be frequency versus time trace or the like, that may contain a plurality of peaks corresponding to in-phase backscatter from a plurality of scattering locations along the fiber optic. A processor/signal anlayzer may be coupled with the detector to generate the trace.

In step 140, a second pulse of electromagnetic radiation from the electromagnetic radiation source may be injected into the fiber optic and in step 150 backscatter from the second pulse may be detected. In step 160, the backscatter from the first and/or the second pulse may be analyzed. Analysis may comprise comparing backscatter from the pulses with a reference backscatter, comparing the two detected backscatters with each other, analyzing the backscatter from the two pulses with signature backscatter from known occurrences and/or the like. In some embodiments, the backscatter collected as a result of passing a plurality of pulses (or electromagnetic input waveforms) down the fiber optic may be analysed, for example to determine the spectral characteristics of the signal at each point of interest. Using a plurality of pulses may provide for estimating/determining a power spectral density.

In an embodiment of the present invention, because the coherence length of the electromagnetic radiation source approaches the pulse length, any changes in relative locations of backscattering sites will cause changes in the backscatter from the two pulses. Moreover, the relative locations of scattering sites only have to change fractions of wavelengths to create such changes in the backscatter. Therefore, in an embodiment of the present invention, an acoustic wave/vibrational in the wellbore and/or the pipeline, which may result from an acoustic occurrence such as a change in the flow of a fluid in the wellbore and/or the pipeline, operation of a device in the wellbore and/or the pipeline and/or the like may interact with the fiber optic changing its configuration and as a result changing the backscatter so that the acoustic occurrence may be identified. Consequently, by monitoring the backscatter in the fiber optic for successive pulses, sections of the wellbore and/or pipeline may be monitored. Moreover, from analysis, modeling, theory, prior experience and/or the like, specific acoustic events may be detected by the signature they may create in the changing backscatter.

In step 170, the location along the fiber optic of the acoustic event may be determined from time-of-flight analysis. In an embodiment of the present invention, from the fiber location of the acoustic event, the location of the acoustic event in the wellbore, reservoir and/or pipeline may be extrapolated.

The method described in FIG. 3 may provide a method for acoustically monitoring flows in subsea pipelines and/or wellbores. For example, the method may provide for acoustically monitoring and/or detecting slug flow and/or blockages in the subsea pipelines and/or wellbores.

In another aspect of the present invention, a pipeline and/or wellbore may be acoustically monitored in accordance with the methods and system discussed above and in conjunction DTS may be used to measure temperatures at one or more locations along the pipeline and/or wellbore. In such and aspect, a leak in the pipeline and/or wellbore may be detected by identifying noise and temperature anomalies occurring at the same location along the pipeline and/or wellbore.

The invention has now been described in detail for the purposes of clarity and understanding. However, it will be appreciated that certain changes and modifications may be practiced within the scope of the appended claims.

What is claimed is:

1. A method for using a fibre optic cable for acoustic monitoring, comprising:
    transmitting a monitoring signal through the fiber optic cable, wherein the monitoring signal comprises at least one pulse of a coherent beam of electromagnetic radiation and a coherence time of the coherent beam of electromagnetic radiation is equal to or longer than a duration of the at least one pulse;
    detecting coherent Rayleigh noise generated by the transmission of the coherent beam of radiation through the fiber optic cable; and
    measuring a phase of the coherent Rayleigh noise; and
    processing the measured phase of the coherent Rayleigh noise to identify an acoustic occurrence along the fibre optic cable.

2. The method of claim 1, further comprising:
    using a time-of-flight of the pulse to identify a location of the acoustic occurrence along the fibre optic cable.

3. The method of claim 1, wherein:
    the step of transmitting the monitoring signal through the fiber optic cable comprises transmitting a pair of mutually coherent pulses each having a different optical frequency into the fiber optic cable.

4. The method of claim 3, wherein:
    the step of measuring the phase of the coherent Rayleigh noise comprises measuring an optical phase difference between the coherent Rayleigh noise generated by the pair of mutually coherent pulses.

5. The method of claim 1, wherein the step of measuring a phase of the coherent Rayleigh noise comprises using a compensating interferometer to measure the phase changes in a region defined by a path-length imbalance of the compensating interferometer.

6. The method of claim 5, wherein the compensating interferometer comprises a Mach-Zehnder interferometer.

7. The method of claim 1, further comprising:
    disposing one or more acoustic transducers along the fiber optic cable.

8. The method of claim 1, further comprising:
    monitoring temperatures at one or more locations along the fibre optic cable.

9. The method of claim 1, further comprising:
    disposing the fibre optic cable in a wellbore; and
    using the fibre optic cable to acoustically monitor at least one of formation conditions around the wellbore, presence of sand in the wellbore, a gravel packing process associated with the wellbore, fracturing of an earth formation surrounding the wellbore, chemical treatments occurring in the wellbore, wellbore integrity, production data for the wellbore, flow assurance in the wellbore and flow properties of fluids in the wellbore.

10. The method of claim 1, further comprising:
    disposing the fibre optic cable in a wellbore or pipeline; and
    disposing one or more vortex-shedding devices in the wellbore or pipeline.

11. The method of claim 10, further comprising:
    measuring a frequency of an acoustic output from the vortex-shedding device, wherein the acoustic output is generated by contact between the vortex-shedding device and a fluid flowing in the wellbore or the pipe; and
    using the measured frequency to determine a velocity of a fluid flow in the wellbore or pipeline.

12. The method of claim 11, further comprising:
    using a time of flight measurement to determine a fluid flow rate of the fluid flow in the wellbore or pipeline.

13. The method of claim 1, further comprising:
    disposing the fibre optic cable in a wellbore or a pipe; and
    determining when the identified acoustic occurrence is produced by fluid exiting the wellbore or pipe.

14. The method of claim 13, further comprising:
    using a time of flight to identify where the fluid is exiting the wellbore or the pipe.

* * * * *